United States Patent
Hayakawa et al.

[19]

[11] Patent Number: 5,607,702
[45] Date of Patent: Mar. 4, 1997

[54] SEGMENT WITH HEATING AND COOLING DEVICE AND MOLD USING THE SEGMENTS

[75] Inventors: Koji Hayakawa, Handa; Isao Nakajima; Yusuke Utsumi, both of Nagoya, all of Japan

[73] Assignee: NGK Insulators, Ltd., Japan

[21] Appl. No.: 472,689

[22] Filed: Jun. 6, 1995

[30] Foreign Application Priority Data

Dec. 28, 1994 [JP] Japan ................................. 6-327679

[51] Int. Cl.⁶ ............................................. B29C 45/73
[52] U.S. Cl. .................... 425/121; 249/81; 425/129.1; 425/552; 425/573; 425/451.9
[58] Field of Search ................................ 249/81, 160, 79, 249/107, 141; 425/121, 129.1, 234, 543, 573, 552, 451.9, 812; 264/271.1, 275; 174/178, 179, 181

[56] References Cited

U.S. PATENT DOCUMENTS

| | | | |
|---|---|---|---|
| 399,139 | 3/1889 | Fenner et al. | 249/81 |
| 2,991,506 | 7/1961 | Crandall | 425/812 |
| 4,703,912 | 11/1987 | Aoki | 425/552 |
| 4,884,961 | 12/1989 | Iizuka et al. | 249/79 |
| 5,484,564 | 1/1996 | Goto | 264/275 |
| 5,498,387 | 3/1996 | Carter et al. | 264/318 |

FOREIGN PATENT DOCUMENTS

| | | | |
|---|---|---|---|
| 3034579A1 | 4/1981 | Germany | 174/179 |
| 3621653A1 | 4/1987 | Germany | 174/179 |
| 58-183211 | 10/1983 | Japan | 249/79 |
| 58-181610 | 10/1983 | Japan | 249/81 |
| 3774 | 5/1903 | United Kingdom | 249/81 |

*Primary Examiner*—Robert Davis
*Attorney, Agent, or Firm*—Parkhurst, Wendel & Burr, L.L.P.

[57] ABSTRACT

A segment used for producing a composite insulator having a core member and a housing member arranged around the core member and constructed by a trunk portion and a shed portion is disclosed. The segment has a pair of segment molds detachably connected at a partition plane and a heating and cooling passage arranged in the segment molds respectively. The segment molds have a through-hole through which the core member is arranged, an upper plane forming portion arranged at its one end surface for defining an upper plane of the shed portion, and a lower plane forming portion arranged at its other end surface for defining a lower plane of the shed portion. A heating or cooling medium is passed through the heating and cooling passage. Moreover, a mold is constructed by integrating a plurality of segments with the heating and cooling passage mentioned above.

9 Claims, 4 Drawing Sheets

SEGMENT WITH HEATING AND COOLING DEVICE AND MOLD USING THE SEGMENTS

BACKGROUND OF THE INVENTION

1. Field of the Invention

The present invention relates to a segment with a heating and cooling device and a mold using the segment mentioned above, which can preferably produce a composite insulator consisting of a core member and a housing member arranged around the core member, the housing member being constructed by a trunk portion and a shed portion.

2. Related Art Statement

Generally, various types of composite insulators have been known as an insulation member to be used for a shell of, for example, a bushing. FIG. 4 is a schematic view showing one embodiment of a known composite insulator. In FIG. 4, a composite insulator 51 comprises a core member 52 made of, for example, FRP tube, and a housing member 55 arranged around the core member 52. Moreover, the housing member 55 is constructed by a trunk portion 53 and a plurality of shed portions 54 arranged outwardly from the trunk portion 53. Further, fitting members 56 are arranged at both end portions of the core member 52. In the known composite insulator 51 mentioned above, the housing member 55 constructed by the trunk portion 53 and the shed portion 54 is preferably made by a silicone rubber.

The known composite insulator 51 having the construction mentioned above is produced by using a mold 61 as shown in FIG. 5. In FIG. 5, the mold 61 comprises a through-hole 62 through which the core member 52 made of the FRP tube is arranged, and a shed forming recess 63 for forming the shed portion 54. The mold 61 may be formed by an integral type or a divided type. Moreover, a heating device 66 such as a heater or the like for heating the mold 61 is arranged outside of the mold 61.

In FIG. 5, the core member 52 is set in the through-hole 62 by means of the fitting members 56. Since an outer diameter of the core member 52 is smaller than an inner diameter of the through-hole 62, a space for forming the trunk portion 53 can be arranged between the core member 52 and the mold 61. Then, an elastic polymer material, preferably a silicone rubber, is supplied from an elastic polymer material inlet 65 into the space between the core member 52 and the mold 61. After that, the supplied elastic polymer material is cured by heating the mold 61 by means of the heating device 66. Finally, the mold 61 is moved, for example, downwardly to obtain the composite insulator 51.

In the producing method mentioned above, it is possible to produce the composite insulator. However, since the heating device 66 is arranged outside of the mold 61, a drawback occurs in the case of heating the elastic polymer material, such that it takes a lot of time for heating from a temperature at a start of the heating operation to a predetermined curing temperature by means of the heating device 66. Moreover, in the producing method mentioned above, it is necessary to set the next composite insulator in the mold 61 after the elastic polymer material is cured at the curing temperature and the current composite insulator is detached from the mold 61. In this case, if a temperature of the mold 61 is higher than for example room temperature, the elastic polymer material starts to be cured. Therefore, when the elastic polymer material for the next composite insulator is supplied in the mold 61, it is necessary to cool the mold 61 to a temperature such as room temperature at which the elastic polymer material is not cured at all. In the producing method mentioned above, since a heat capacity of the mold 61 is large, a drawback occurs such that it takes a lot of time to cool the mold 61. Further, since the elastic polymer material to be heated is arranged apart from the heating device 66, a drawback occurs such that a temperature distribution during the heating operation is not uniform. Therefore, in the known method of producing the composite insulator, the time necessary for producing the composite insulator increases and producing efficiency becomes decreases.

SUMMARY OF THE INVENTION

An object of the present invention is to eliminate the drawbacks mentioned above, and to provide a segment with a heating and cooling device and a mold using the segment which can perform a heating and cooling operation of the mold faster and can improve producing efficiency.

According to the invention, a segment used for producing a composite insulator having a core member and a housing member arranged around the core member, the housing member being constructed by a trunk portion and a shed portion, comprises a pair of segment molds detachably connected at a partition plane having a through-hole at its center portion through which the core member is arranged, an upper plane forming portion arranged at its one end surface for defining an upper plane of the shed portion, and a lower plane forming portion arranged at its other end surface for defining a lower plane of the shed portion; and a heating and cooling device arranged in the segment molds respectively for passing a heating or cooling medium therethrough.

Moreover, according to the invention, a mold using the segment with the heating and cooling device is characterized in that a plurality of segments with the heating and cooling device are integrated.

The term "insulator" used in this application includes a so-called hollow insulator. The "hollow insulator" is an insulating member to be used in a bushing shell, and has a through-hole through which a conducting member is passed in an axial direction. The "bushing" means a device for supporting a conducting member through a wall or a partition wall in an insulated manner when the conducting member is passed through the wall or the partition wall of a tank or the like.

In the segment with the heating and cooling means mentioned above, since the heating and cooling passage as the heating and cooling device is arranged in the segment itself, it is possible to rapidly heat or cool the segment by passing a heating or cooling medium through the heating and cooling passage. Therefore, if the mold is constructed by arranging integrally a plurality of segments mentioned above, it is possible to produce the composite insulator effectively. Moreover, since the heating and cooling passage can be arranged near the elastic polymer material to be heated or cooled, it is possible to make uniform the temperature distribution in the mold, as compared with the know method in which the heating device is arranged outside of the mold.

Further, an inlet and an outlet are arranged at both ends of the heating and cooling passage of the segment, and the mold is formed by arranging integrally a plurality of segments and by connecting the inlets with the outlets or the outlets with the inlets of the adjacent segments so as to continuously supply the heating or cooling medium through the heating and cooling passages of all the segments. In this case, since the heating and cooling passage of the mold can be made simple, the construction mentioned above is a preferred embodiment. Moreover, if the heating and cooling passage is formed by connecting a plurality of straight holes formed by a drill and by sealing end portions of the straight holes except for the inlet and outlet, the heating and cooling passage can be arranged in the segment simply, and thus it is preferred.

DESCRIPTION OF THE PREFERRED EMBODIMENT

Figure 1:
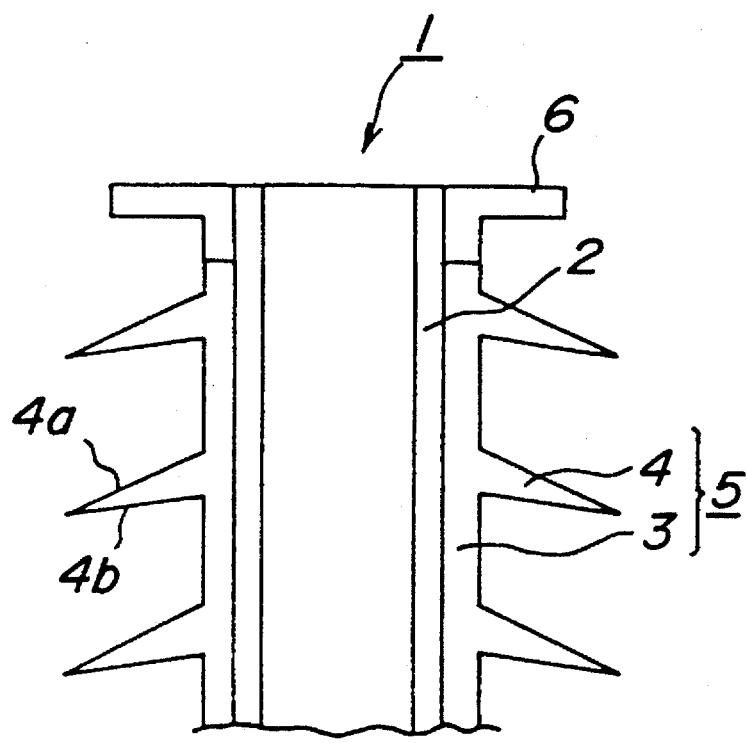
FIG. 1 is a schematic view showing one embodiment of a composite insulator to be produced by using a segment with a heating and cooling device according to the invention.

FIG. 1 is a schematic view showing one embodiment of a composite insulator to be formed by using a segment with a heating and cooling device according to the invention. In FIG. 1, a composite insulator 1 to be formed by the present invention is constructed by a core member 2 made of for example, FRP tube, and a housing member 5 made of an elastic polymer material such as a silicone rubber or the like which is arranged around the core member 2. Fitting members 6 are arranged at both end portions of the core member 2. The housing member 5 is constructed by a trunk portion 3 and a plurality of shed portions 4 arranged outwardly from the trunk portion 3. Moreover, the shed portion 4 has an upper plane 4a and a lower plane 4b. In this case, the upper plane 4a and the lower plane 4b mean planes positioned at an upper side and a lower side of the shed portion 4 respectively with respect to the upright composite insulator 1.

Figure 2B:
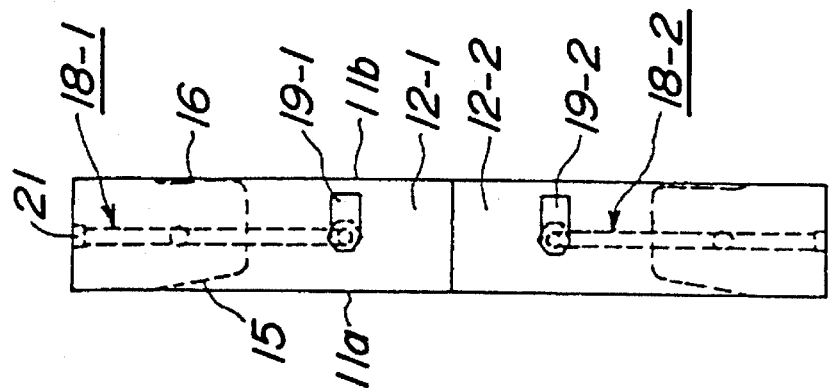
FIGS. 2a and 2b are a front view and a side view respectively illustrating one embodiment of the segment with the heating and cooling device according to the invention.
Figure 2A:
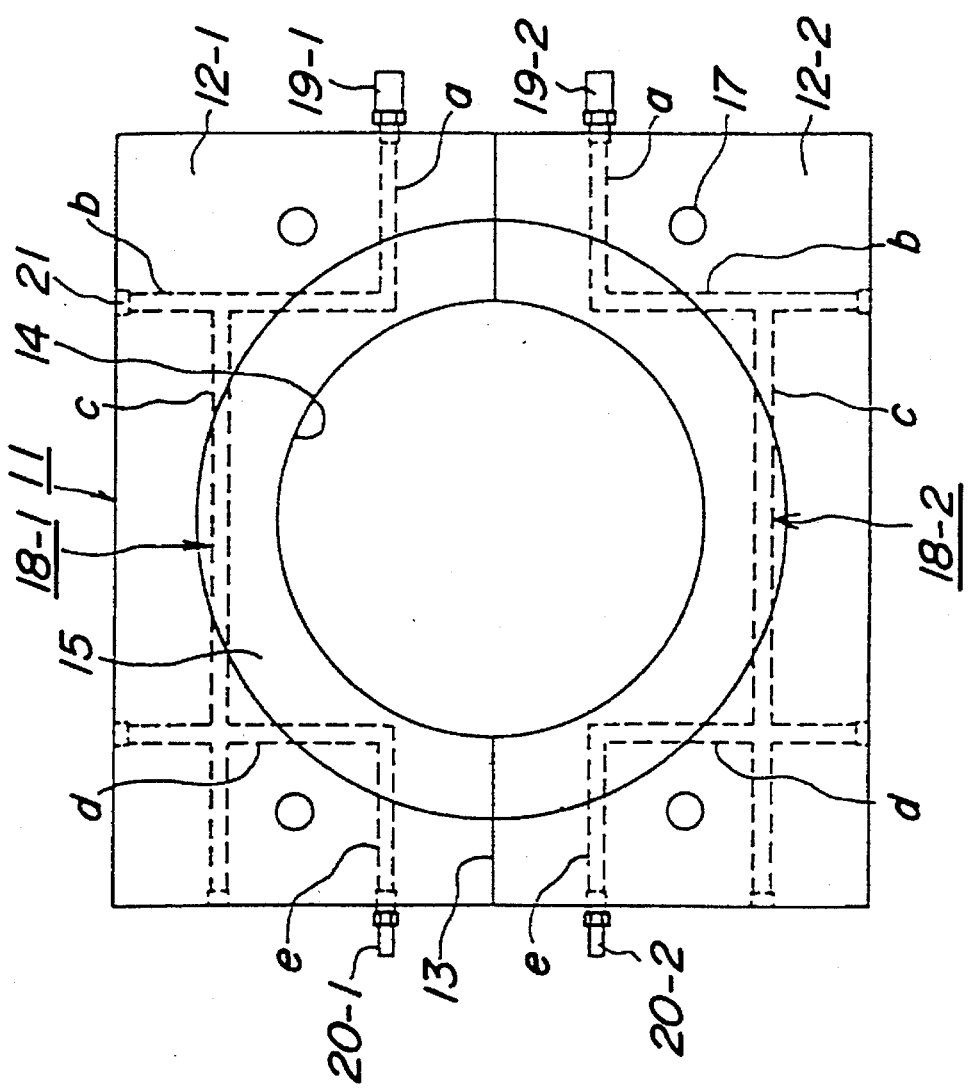

FIG. 2 is a schematic view showing one embodiment of a segment with a heating and cooling device according to the invention, in which FIG. 2a illustrates a front view and FIG. 2b depicts a side view. In FIG. 2, a segment 11 is constructed by a pair of segment molds 12-1 and 12-2. The segment molds 12-1 and 12-2 are detachably connected with each other at a partition plane 13 to form the segment 11. Moreover, a through-hole 14, through which the core member 2 is arranged, is formed at a center portion of the segment 11. In this case, it is necessary to make a diameter of the through-hole 14 larger than an outer diameter of the core member 2 by a thickness of the trunk portion 3.

An upper plane forming portion 15 having a tapered shape is formed at one end surface 11a of the segment 11. When the mold is constructed by using a plurality of segments 11 as mentioned below, the upper surface forming portion 15 defines the upper plane 4a of the shed member 4. Moreover, a lower plane forming portion 16 having a tapered shape is formed at the other end surface 11b of the segment 11 in the same manner. The lower plane forming portion 16 defines the lower plane 4b of the shed member 4. In order to make a space for forming the shed member in the mold constructed by using a plurality of segments 11, it is necessary to set an inclination of the upper plane forming portion 15 gentler than that of the lower plane forming portion 16 as shown in FIG. 2. Moreover, a numeral 17 is a hole for passing a connection bolt in the case of forming the mold by using a plurality of segments 11.

In this embodiment, important features of the segment 11 are that heating and cooling passages 18-1 and 18-2, through which a heating or cooling medium is passed, are arranged respectively in the segment molds 12-1 and 12-2 and that medium inlets 19-1, 19-2 are arranged respectively at one end portions of the heating and cooling passages 18-1, 18-2 and also medium outlets 20-1, 20-2 are arranged respectively at the other end portions of the heating and cooling passages 18-1, 18-2. In this case, in order to form the heating and cooling passages 18-1, 18-2, straight holes a to e are formed on the same plane by a drill or the like in such a manner that the holes a and b, the holes b and c, the holes c and d and the holes d and e are respectively connected with each other as shown in FIG. 2a. Moreover, end portions of the holes b, c and d opened at a surface of the segment 11 are sealed by plugs 21.

Figure 3:
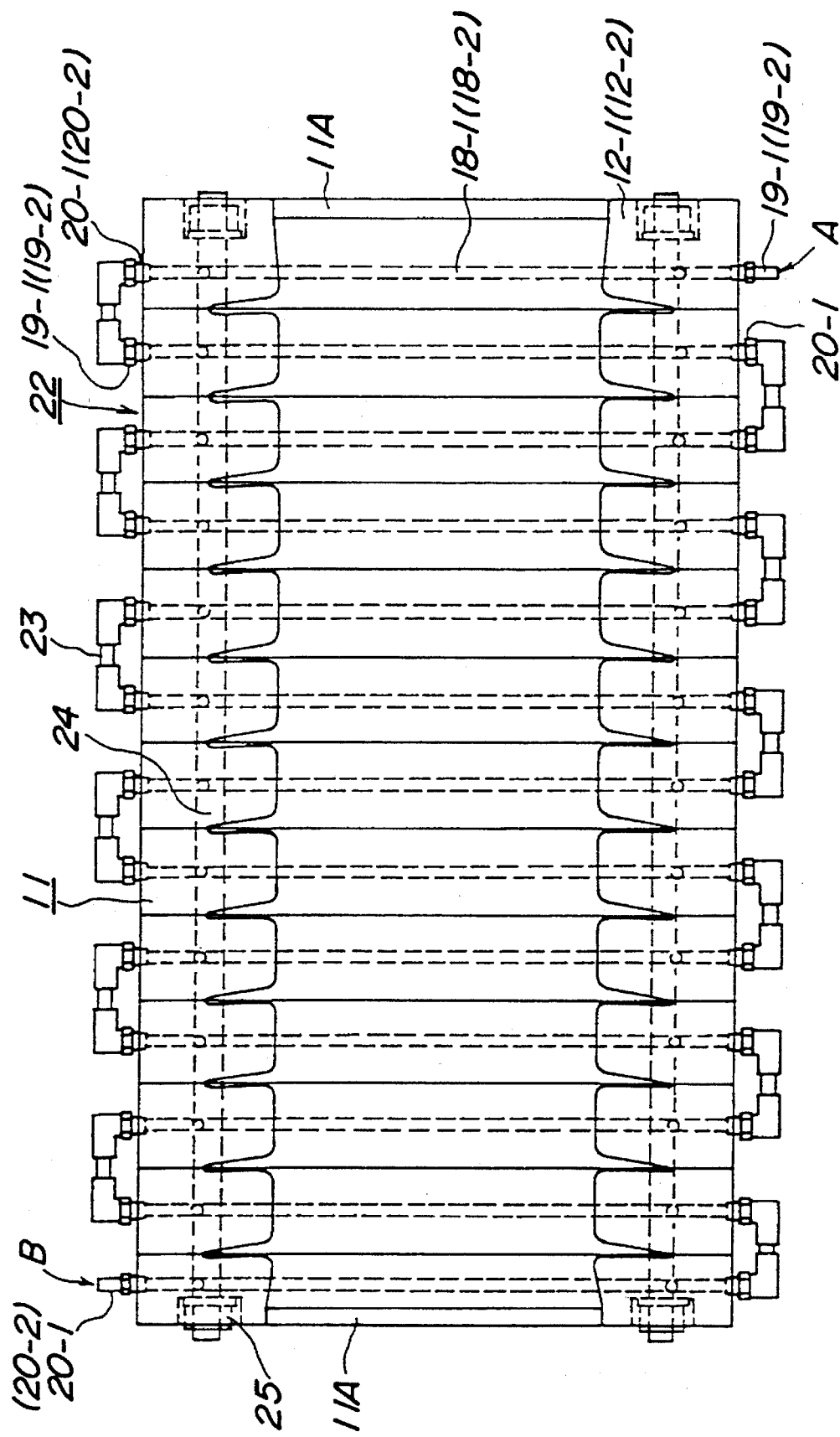
FIG. 3 is a schematic view depicting one embodiment of a mold according to the invention which is formed by a plurality of the segments.
Figure 4:
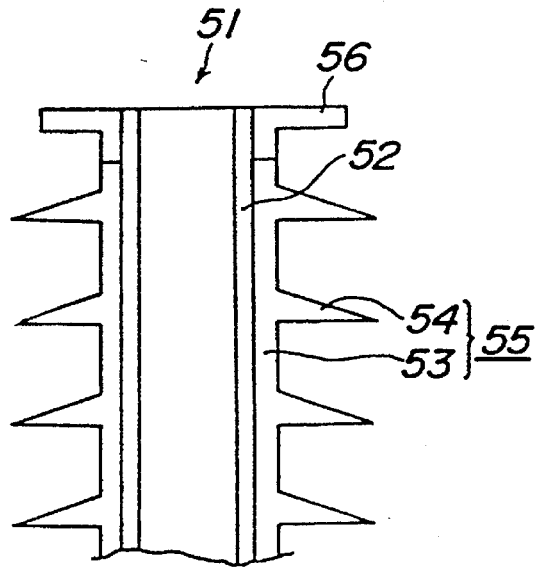
FIG. 4 is a schematic view showing one embodiment of a known composite insulator.
Figure 5:
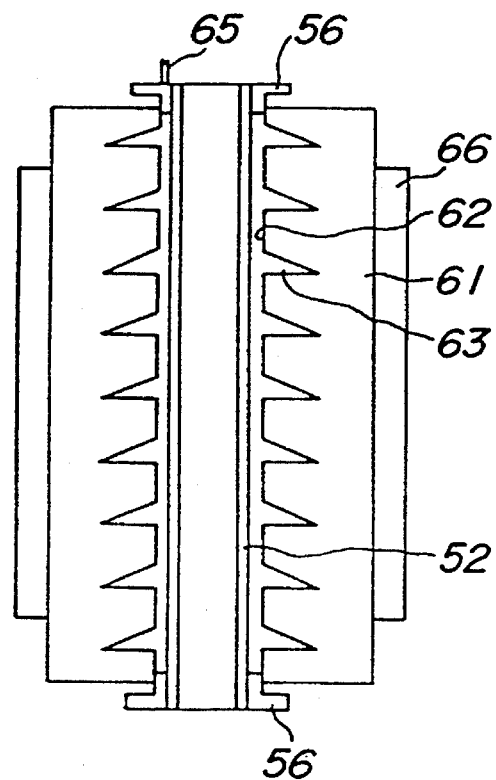
FIG. 5 is a schematic view illustrating one embodiment of a known mold used for producing the known composite insulator.

FIG. 3 is a schematic view showing one embodiment of a mold constructed by using a plurality of segments according to the invention. The embodiment shown in FIG. 3 is illustrated by a cross section at the partition plane 13, and each segment 11 has the same construction as that of FIG. 2. In FIG. 3, a mold 22 is constructed by using a plurality of segments 11 in such a manner that tension bolts 24 are arranged through the holes 17 of the stacked segments 11 and nuts 25 are engaged with the tension bolts 24 at its both ends so as to fasten the stacked segments 11 integrally. In this case, both of the outermost segments 11A have a flat plane at its outermost surface.

In this embodiment, important features of the mold 22 are that a continuous heating and cooling passage 18-1(18-2) is formed in the stacked segment molds 12-1(12-2) of a lower mold or an upper mold of the mold 22 in such a manner that the medium inlet 19-1(19-2) of one segment mold 12-1(12-2) is connected with the medium outlet 20-1(20-2) of the adjacent segment mold 12-1(12-2) by means of a pipe 23 as shown in FIG. 3. In this case, the heating or cooling medium is supplied to A portion of the medium inlet 19-1(19-2) and is discharged from B portion of the medium outlet 20-1(20-2).

As for the heating or cooling medium used in the segment and the mold according to the invention, it is possible to use all the known heating or cooling media, if the heating medium can be heated to about 80° C. at which the elastic polymer material is cured and if the cooling medium can be cooled down to about room temperature. Moreover, as for an apparatus for supplying the heating or cooling medium to the mold, it is possible to use all the apparatuses if it can supply the heating medium and the cooling medium alternately. However, among those apparatuses, it is preferred to use a thermoregulator which is on the market.

The present invention is not limited to the embodiments mentioned above and various variations are possible. For example, in the embodiments mentioned above, one continuous heating and cooling passage is formed in the stacked segment molds which construct the lower mold or the upper mold of the mold, and the heating or cooling medium is supplied from one end of the continuous heating and cooling passage and is discharged from the other end thereof. However, it is possible to perform the medium supplying and discharging operation in such a manner that the medium is supplied to all the medium inlets of the segment molds at the same time, in which no continuous heating and cooling passage is arranged, and is discharged from all the medium outlets of the segment molds at the same time. In this case, it is possible to obtain a uniform temperature distribution faster than that of the embodiment mentioned above.

As can be clearly understood from the above explanation, according to the invention, since the heating and cooling passage is formed in the segment itself and the heating or cooling medium is passed through the heating and cooling passage, it is possible to rapidly heat and cool the segment itself. Therefore, if a plurality of the segments with the heating and cooling device mentioned above are integrated to form the mold, it is possible to produce the composite insulator effectively. Moreover, since the heating and cooling passage can be arranged near the elastic polymer material to be heated or cooled, it is possible to perform a uniform temperature distribution in the mold as compared with the known mold in which the heating device is arranged outside of the mold.

What is claimed is:

1. A mold segment for molding a composite insulator having a core and a housing formed around the core, the housing having a trunk portion and a plurality of shed portions, said mold segment comprising:

generally planar first and second half-mold segments each comprising (i) an upper surface, at least a portion of which defines a lower plane of a shed portion of the composite insulator, (ii) a lower surface, at least a portion of which defines an upper plane of the shed portion of the composite insulator, and (iii) an inside surface having first and second linear end portions defining a partition plane between said first and second half-mold segments, and a semicircular portion between the linear end portions defining a through-hole for accommodating the core and trunk portion of the composite insulator; and heat transfer means arranged in each half-mold segment and extending from a first outer end of said mold segment adjacent said first linear end portion to a second outer end of said mold segment adjacent said second linear end portion, with a substantial portion of said heat transfer means being positioned between the lower and upper plane forming surfaces of said upper and lower surfaces.

2. The mold segment according to claim 1, wherein said heat transfer means comprises a passage.

3. The mold segment according to claim 2, wherein said passage has a medium inlet at one end thereof and a medium outlet at the other end thereof.

4. The mold segment according to claim 2, wherein said passage is formed by connecting a plurality of straight holes formed in said half-mold segment.

5. The mold segment according to claim 4, wherein end portions of said straight holes other than said medium inlet and medium outlet are sealed.

6. The mold segment according to claim 1, wherein a diameter of said through-hole is larger than an outer diameter of the core by a thickness of the trunk portion.

7. The mold segment according to claim 1, wherein an inclination of said lower plane forming surface is less than that of said upper plane forming surface.

8. A mold for forming a composite insulator having a core and a housing formed around the core, the housing having a trunk portion and a plurality of shed portions, said molding comprising:

a plurality of mold segments stacked one on top of the other, each mold segment comprising:

generally planar first and second half-mold segments each comprising (i) an upper surface, at least a portion of which defines a lower plane of a shed portion of the composite insulator, (ii) a lower surface, at least a portion of which defines an upper plane of the shed portion of the composite insulator, and (iii) an inside surface having first and second linear end portions defining a partition plane between said first and second half-mold segments, and a semicircular portion between the linear end portions defining a through-hole for accommodating the core and trunk portion of the composite insulator; and heat transfer means arranged in each half-mold segment and extending from a first outer end of said mold segment adjacent said first linear end portion to a second outer end of said mold segment adjacent said second linear end portion, with a substantial portion of said heat transfer means being positioned between the lower and upper plane forming surfaces of said upper and lower surfaces.

9. The mold according to claim 8, wherein said heat transfer means of adjacent half-mold segments are connected to pass a heating or cooling medium continuously through the entire mold.

* * * * *